US011958611B2

United States Patent
Handley

(10) Patent No.: US 11,958,611 B2
(45) Date of Patent: Apr. 16, 2024

(54) ADJUSTABLE AND PORTABLE WORKSTATION FOR USE WITH A SEAT BACK TRAY TABLE

(71) Applicant: Eric T. Handley, Tacoma, WA (US)

(72) Inventor: Eric T. Handley, Tacoma, WA (US)

( * ) Notice: Subject to any disclaimer, the term of this patent is extended or adjusted under 35 U.S.C. 154(b) by 0 days.

(21) Appl. No.: 17/962,426

(22) Filed: Oct. 7, 2022

(65) Prior Publication Data

US 2023/0114541 A1 Apr. 13, 2023

Related U.S. Application Data

(60) Provisional application No. 63/253,960, filed on Oct. 8, 2021.

(51) Int. Cl.
*B64D 11/06* (2006.01)
*A47B 9/14* (2006.01)

(52) U.S. Cl.
CPC ............ *B64D 11/0638* (2014.12); *A47B 9/14* (2013.01)

(58) Field of Classification Search
CPC ...... A47B 2003/008; A47B 2003/0824; A47B 3/08; A47B 3/0818; A47B 3/10; A47B 9/14
See application file for complete search history.

(56) References Cited

U.S. PATENT DOCUMENTS

| 5,720,465 | A | 2/1998 | Peltzer et al. | |
|---|---|---|---|---|
| 7,740,312 | B2 | 6/2010 | Johnson, Jr. | |
| 8,011,731 | B2 | 9/2011 | Goddu | |
| 8,914,926 | B2 | 12/2014 | Berhanu | |
| 8,991,319 | B2 | 3/2015 | Korpi | |
| 9,150,130 | B2 * | 10/2015 | Jackow | B60N 2/806 |
| 9,457,904 | B1 * | 10/2016 | Fey | B64D 11/00 |
| 10,022,002 | B2 | 7/2018 | Chen et al. | |
| 10,273,009 | B2 | 4/2019 | Fishel et al. | |
| 10,449,882 | B2 | 10/2019 | Lev | |
| 11,452,368 | B1 * | 9/2022 | Li | A47B 3/08 |
| 11,452,371 | B1 * | 9/2022 | Li | A47B 3/08 |
| 2001/0003961 | A1 | 6/2001 | Hodge et al. | |
| 2005/0150433 | A1 * | 7/2005 | Lo | A47B 3/0818 |
| | | | | 108/50.01 |
| 2006/0075934 | A1 | 4/2006 | Ram | |

(Continued)

FOREIGN PATENT DOCUMENTS

KR 20200017309 A 2/2020
WO 2015014258 A1 2/2015

*Primary Examiner* — Daniel J Rohrhoff
(74) *Attorney, Agent, or Firm* — Bold IP, PLLC; Binita Singh

(57) ABSTRACT

A portable and adjustable workstation to be used for working or laying one's head when travelling in vehicles such as planes, trains, buses, and the like attachable to a seat back tray table on a vehicle. A platform is connected to a pair of legs and wherein the pair of legs are adjustable to accommodate a width of a seat back tray table by angling outward or angling inward at the connection to the platform. Additionally, the point at which the one or more legs connect to the platform includes a textured feature that prevents the one or more legs from slipping at the connection point once locked into position. The one or more legs may be configured to be telescoping to allow a height of the platform to be adjusted to a desired position. A padding may also be included which fits onto a top surface of the platform.

21 Claims, 5 Drawing Sheets

(56) References Cited

U.S. PATENT DOCUMENTS

| | | | |
|---|---|---|---|
| 2010/0300334 A1* | 12/2010 | Tcholakov | A47B 3/08 |
| | | | 108/127 |
| 2012/0285351 A1* | 11/2012 | Cohen | A47B 3/10 |
| | | | 108/166 |
| 2020/0015453 A1* | 1/2020 | Escalante | A01K 13/001 |
| 2020/0198786 A1 | 6/2020 | Olson | |
| 2022/0118567 A1* | 4/2022 | Darling | A47B 1/05 |
| 2022/0240671 A1* | 8/2022 | Blumenthal | B25H 3/06 |
| 2022/0386772 A1* | 12/2022 | Tabujara | A47B 87/0253 |

* cited by examiner

ADJUSTABLE AND PORTABLE WORKSTATION FOR USE WITH A SEAT BACK TRAY TABLE

CROSS REFERENCE TO RELATED APPLICATIONS

This application is a non-provisional application which claims priority to U.S. Provisional Patent Application No. 63/253,960 filed on Oct. 8, 2021, which is incorporated by reference in its entirety.

FIELD OF DISCLOSURE

The overall field of this invention generally pertains to portable and foldable personal tables, and more specifically tables adapted for travel and for use on the tray tables of commercial aircraft and similar platforms.

BACKGROUND

Travel is almost a normal part of society. People travel for many reasons, including for work and pleasure. Travel systems may range from airplanes, trains, buses, cars, and the like and most accommodate seated travelers. In most systems, travelers seek ease and comfort regardless of whether they are traveling for work or pleasure. Travelers are also looking to use their devices such as laptop computers. Typically, a single tray table is provided for each traveler on some vehicles such as airplanes, trains, and buses. Conventionally, these tray tables are provided for food services and not designed for comfort.

Usually, the tray table is provided within a confined amount of space. The tray table is often provided on the back of the seat, folded upright along the seat back when not in use. In use, the tray table is pulled down to a horizontal position resting at a height slightly above a traveler's waist. This position of the tray table is too low and not ergonomic for eating or working on. A person using the tray table at this low position must bend their neck to an uncomfortable and stressful position when working on an electronic device, reading, or otherwise using an item. The position of the tray table also causes a traveler to have to bend down low to eat a meal. Most tray tables are not adjustable and thus do not offer any options for the travelers. Unfortunately, the seating arrangements in most transportation systems do not allow a full horizontal position and therefore the seated passenger must sleep in a seated position, bend down low and place their head on the tray table, or place their head above the tray table on the neighboring seat.

There are secondary stands available for use when traveling. Some of the secondary stands may be placed on the tray table and permit the height to be adjustable. Others may offer a secondary stand that can be placed on the tray table and used for sleeping. However, there still exists a need for a device that may be used as tabletop and for napping where the tabletop surface can accommodate both uses and operate in conjunction with a tray table. Thus, the existing devices and techniques are not perfect and there is room for improvement.

Accordingly, there is still an unsolved need for an adjustable and portable workstation that may address these and other existing issues.

SUMMARY

One or more embodiments are provided below for a device that can be used as a tabletop or a napping surface when traveling in vehicles such as planes, trains, buses, and the like. The device is a portable workstation that can be connected to a seat back tray table provided on some vehicles (as mentioned above). The device is also configured to be adjustable whereby the device can accommodate varying sizes of seat back tray tables and adjust to fit with an available tray table.

The portable workstation may include a platform and one or more legs. The platform is a flat surface designed for working, eating, or napping on a vehicle such as an airplane. The platform is connected to the one or more legs and wherein the platform and the one or more legs are connected such that when the legs are adjusted to accommodate a width of a seat back tray table, a point at which the one or more legs connect to the platform includes a textured feature that prevents the one or more legs from slipping at the connection point once locked into position. The one or more legs may be configured to be telescoping to allow a height of the platform to be adjusted to a desired position.

Thus, it is an object of the present disclosure to provide an improved device to be used as a tabletop when traveling in vehicles such as planes, trains, buses, and the like. Additionally, it is also an object of the present disclosure to provide a surface for napping when traveling in vehicles such as planes, trains, buses, and the like.

Other aspects and advantages of the present disclosure will become apparent upon consideration of the following description.

BRIEF DESCRIPTION OF THE DRAWINGS

Embodiments of the present disclosure are described in detail below with reference to the following drawings. These and other features, aspects, and advantages of the present disclosure will become better understood with regard to the following description, appended claims, and accompanying drawings. The drawings described herein are for illustrative purposes only of selected embodiments and not all possible implementations and are not intended to limit the scope of the present disclosure.

DETAILED DESCRIPTION

Figure 1:
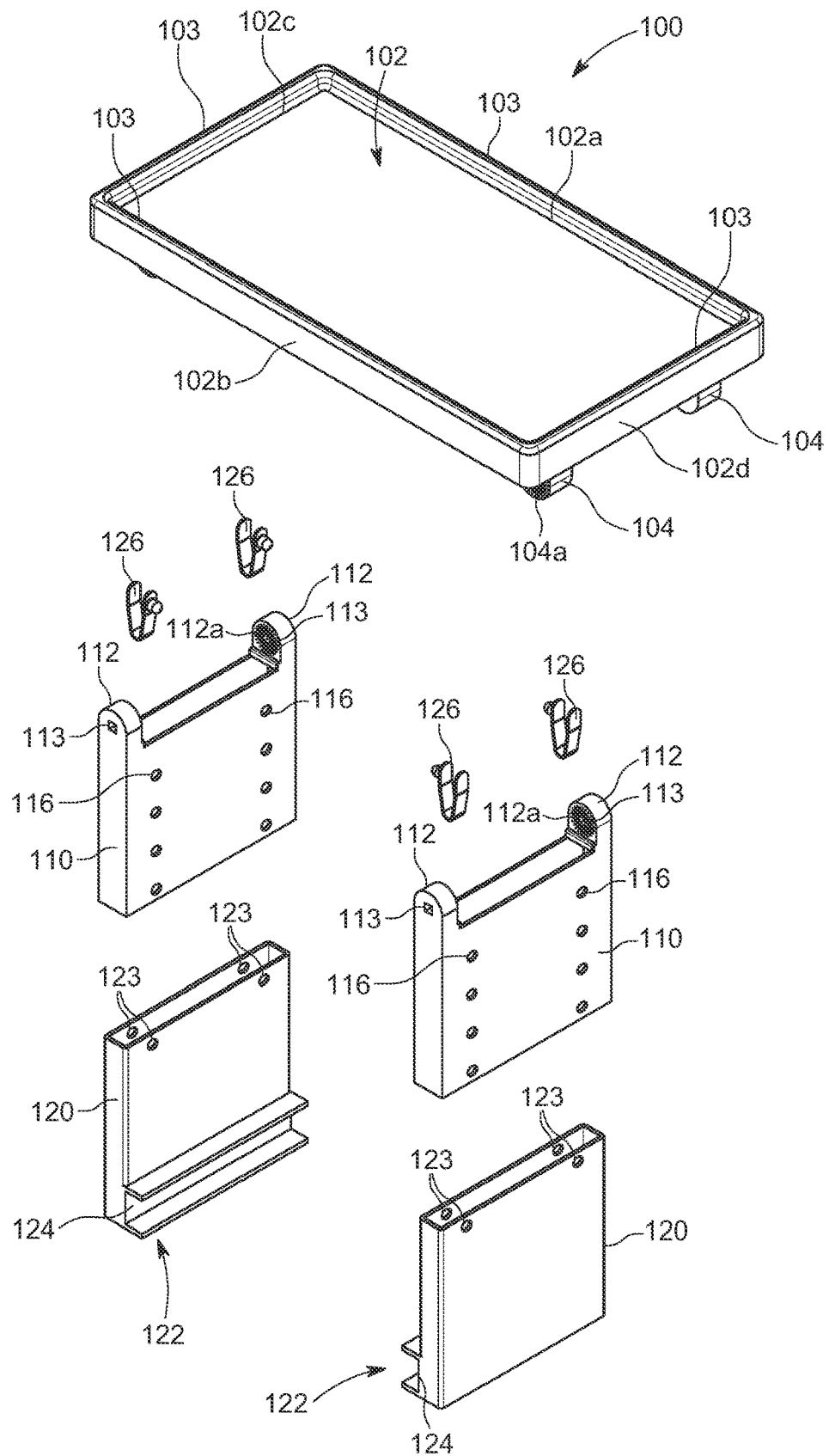
FIG. 1 is a pictorial illustration depicting an exploded view of an adjustable workstation in accordance with an illustrative embodiment.

In the Summary above and in this Detailed Description, and the claims below, and in the accompanying drawings, reference may be made to particular features of the invention. It may be understood that the disclosure of the invention in this specification includes all possible combinations of such particular features. For example, where a particular feature may be disclosed in the context of a particular aspect or embodiment of the invention, or a particular claim, that feature can also be used, to the extent possible, in combination with and/or in the context of other particular aspects and embodiments of the invention, and in the invention generally.

Where reference may be made herein to a method comprising two or more defined steps, the defined steps can be carried out in any order or simultaneously (except where the context excludes that possibility), and the method can include one or more other steps which are carried out before any of the defined steps, between two of the defined steps, or after all the defined steps (except where the context excludes that possibility).

"Exemplary" may be used herein to mean "serving as an example, instance, or illustration." Any aspect described in this document as "exemplary" may not necessarily be construed as preferred or advantageous over other aspects.

Throughout the drawings, like reference characters are used to designate like elements. As used herein, the term "coupled" or "coupling" may indicate a connection. The connection may be a direct or an indirect connection between one or more items. Further, the term "set" as used herein may denote one or more of any items, so a "set of items" may indicate the presence of only one item or may indicate more items. Thus, the term "set" may be equivalent to "one or more" as used herein.

The present disclosure recognizes the unsolved need for an improved workstation to be used as a tabletop and for napping when traveling on vehicles such as planes, trains, buses, and the like. The present disclosure recognizes the common problem of a person having to bend their neck and body into a stressful position to use a tray table on a seat back for using as a tabletop and for napping.

The present disclosure describes an adjustable and portable workstation which can be used in conjunction with a seat back tray table on a vehicle such as a plane, train, bus, or the like. The adjustable workstation comprises a platform, one or more adjustable legs, a means to secure the adjustable workstation to a seat back tray, and a specially designed cushion to place on top of the platform for napping. The adjustable workstation may be adjustable in height and also adjustable in being capable of attaching to varied widths of seat back tray tables. Additionally, the adjustable workstation can be folded into a compact state to be stored easily and is portable.

Referring to the figures, FIGS. 1-8 depict an adjustable workstation 100 in various states in accordance with a non-limiting embodiment of the present invention. The adjustable workstation 100 is adjustable, collapsible, and durable. The adjustable workstation 100 may be attached to a seat back tray table on a vehicle such as, and not limited to, an airplane. As shown, the adjustable workstation 100 may comprise a platform 102 and a pair of legs 110. The platform 102 is a flat surface designed for working, eating, or napping on a vehicle such as an airplane. The platform 102 is connected to the pair of legs 110. The pair of legs 110 may be telescoping to adjust a height of the platform 102 at a desired position. The pair of legs 110 are also configured to allow adjustability for accommodating varied sizes of seat back tray tables, wherein an angle at the connection of the pair of legs 110 to the platform 102 can be adjusted.

The platform 102 of the adjustable workstation 100 is preferably dimensioned to be commensurate with a standard seat back tray table on an airplane. The platform 102 may be rectangular in shape and have a length and a width wherein the length may range from 7 inches to 11 inches and the width may range from 12 inches to 16 inches. Further, the platform 102, may be described as having a top surface and a bottom surface. The top surface of the platform may generally be described as a work surface of the platform 102, which is the surface on which a user will rest their laptop, book, food, etc. and the surface for laying one's head on when desired to rest. The platform 102 of the adjustable workstation 100 may also contain features useful for preventing items placed on the platform 102 from slipping off. As can be seen, the top surface of the platform 102 may be incorporated with a raised lip 103 along an upper edge 102*a*, a lower edge 102*b*, a left edge 102*c*, and a right edge 102*d* which define a perimeter of the platform 102. As used herein, the terms "upper" and "lower" are interchangeable, and the terms "left" and "right" are interchangeable and dependent on a position the adjustable workstation 100 is attached to a seat back tray table. As seen in the Figures, the top surface or the work surface of the platform 102 is recessed between the raised lip 103 providing a wall to prevent an item or items from slipping or rolling off the edges 102*a*, 102*b*, 102*c*, and 102*d*. Additionally, the top surface of the platform 102 may have some frictional element to minimize sliding of items placed thereon.

Figure 2:
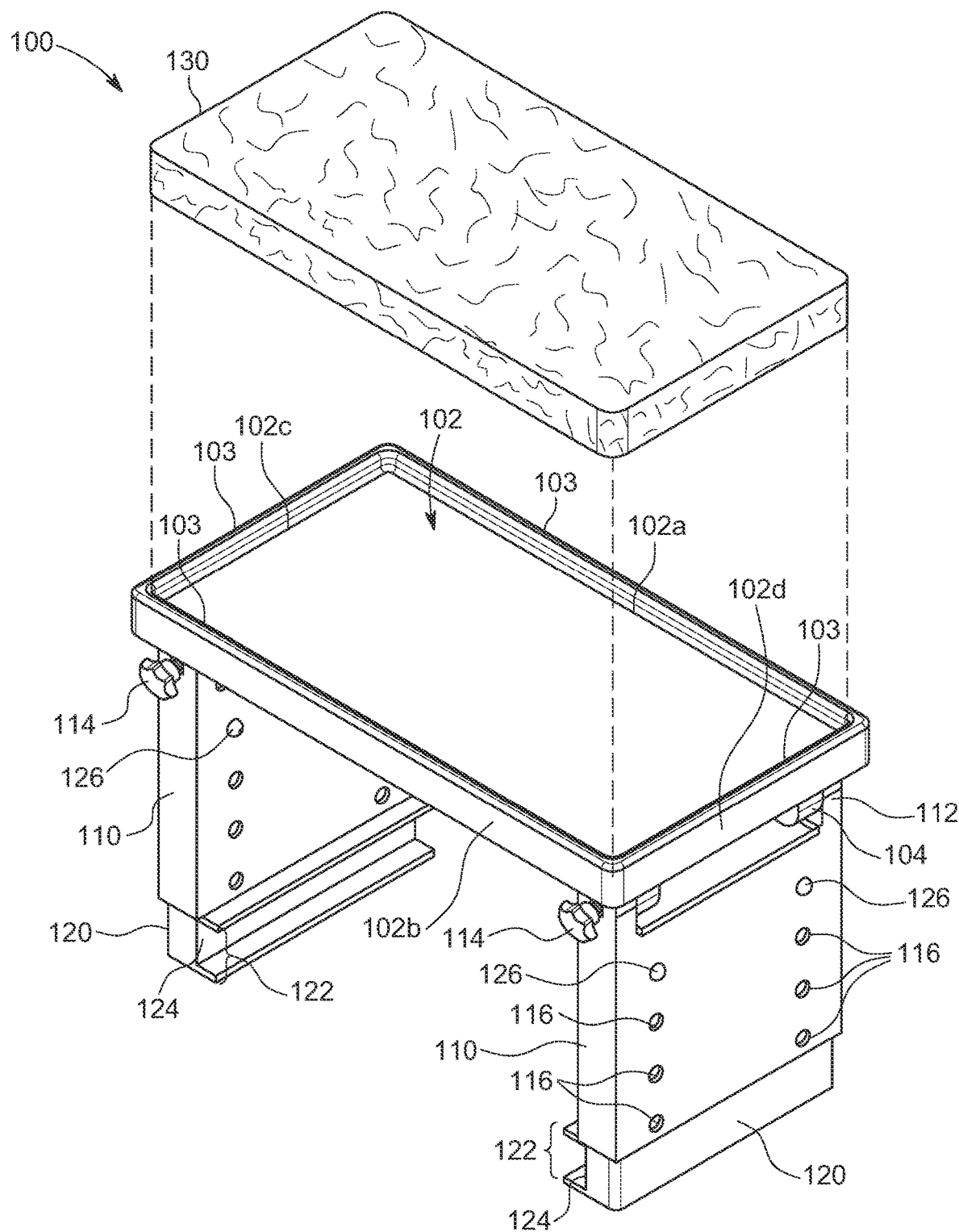
FIG. 2 is a pictorial illustration of a perspective view of an adjustable workstation in accordance with an illustrative embodiment.
Figure 3:
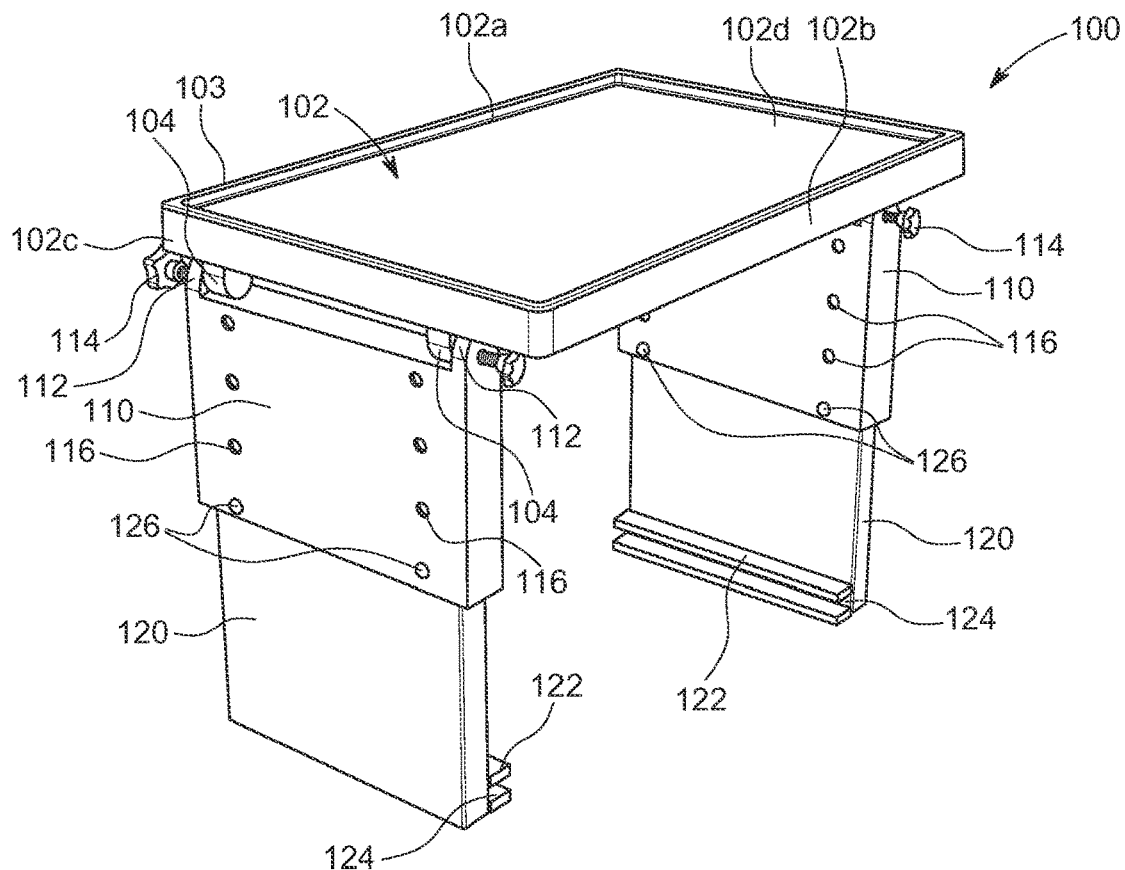
FIG. 3 is a pictorial illustration of an adjustable workstation with legs extended in accordance with an illustrative embodiment.

As shown in FIG. 2, a padding 130 is also included in the adjustable workstation 100. The padding 130 is specially designed and dimensioned to fit on the top surface of the platform 102 within the raised lip 103. The padding 130 is designed to be commensurate in shape and size to the top surface with its edges abutting against the raised lip 103. The raised lip 103 prevents the padding 130 from sliding off the platform 102. The padding 130 may include a removable cover for ease of cleaning. The padding 130 may be fashioned from material that is comfortable and maintains its structure including, and not limited to, foam stuffing, feather stuffing, down stuffing, cotton stuffing, and polyester stuffing The bottom surface of the platform 102 includes a pair of downward extending posts 104 along the left edge 102*c* and a pair of downward extending posts 104 along the right edge 102*d* which are either removably integrated on the bottom surface of the platform 102 or configured as a permanent feature on the bottom surface of the platform 102. In the Figures shown, each of the downward extending posts 104 extend perpendicularly away from the bottom surface of the platform 102 and are fashioned in a U-shape with a bottom of the U as an end further away from the platform 102. It is to be understood that the downward extending posts 104 may include any shape including, and not limited to, a quadrilateral. Specifically, the downward extending posts 104 may be included on each of a corner on the bottom surface of the platform 102. Each of the downward extending posts 104 include an opening 105, wherein the openings 105 on the downward extending posts 104 along the left edge 102*c* face each other, and the openings 105 on the downward extending posts 104 along the right edge 102*d* face each other. Additionally, a surface on an outer facing side 104*a* of the downward extending posts 104 (may be referred to as an outer surface 104*a*) is textured. In particular, the outer surface 104*a* of each of the downward extending posts 104 includes grooves encircling the opening 105.

The adjustable workstation 100 also comprises of the pair of legs 110. As best seen in FIGS. 1-5, the pair of legs 110 of the adjustable workstation 100 are provided opposite each other along the left and right side 102c, 102d of the platform 102. Specifically, the pair of legs 110 are connected to the bottom surface of the platform 102 with a first leg of the pair of legs 110 along the left edge 102c and a second leg of the pair of legs 110 along the right edge 102d. As shown in the illustrations, the first leg of the pair of legs 110 extends along the left edge 102c of the platform 102, from the upper edge 102a to the lower edge 102b. Similarly, the second leg of the pair of legs 110 extends along the right edge 102d of the platform 102, from the upper edge 102a to the lower edge 102b. The one or more legs 110 have a quadrilateral shape to add more strength and stability to the adjustable workstation 100 when in use.

The pair of legs 110 are hingedly connected to the bottom surface of the platform 102 such that the pair of legs 110 may pivot in an inward direction and an outward direction at the platform 102. In particular, the pair of legs 110 are connected to the downward extending posts 104 on the platform 102 via a fastener 114. Each of the pair of legs 110 is shown to comprise of two upward extending posts 112 which are configured at a top edge of each leg 110, and specifically at each end of each leg 110. The upward extending posts 112 correspond with the shape of the downward extending posts 104. The downward extending posts 104 along the left edge 102c of the platform are placed between the upward extending posts 112 on the first leg of the pair legs 110. Similarly, the downward extending posts 104 along the right edge 102d of the platform 102 are placed between the upward extending posts 112 on the second leg of the pair of legs 110. The downward extending posts 104 and the upward extending posts 112 abut against each other. Specifically, a surface on an inner facing side 112a of each of the upward extending posts 112 (may be referred to as an inner surface 112a) align with and abut against the outer surface 104a of the corresponding downward extending post 104. Each of the upward extending posts 112 includes openings 113 which also includes ridges on the inner surface 112a encircling each of the openings 113. The openings 113 on the upward extending posts 112 align with the openings 105 on the corresponding downward extending posts 104 such that the ridges on the inner surface 112a and the grooves on the outer surface 104a matingly abut against each other. The ridges on the inner surface 112a and the grooves on the outer surface 104a engage with each other to prevent the inner and outer surfaces 112a, 104a from slipping against each other and in turn prevent the pair of legs 110 from slipping at the connection with the platform 102.

In the non-limiting embodiment shown in the Figures, the adjustable workstation includes fasteners 114 wherein one fastener passes through a single connection of the openings 105, 113 in the downward extending posts 104 (on the platform 102) and the upward extending posts 112 (on the pair of legs 110). Thus, in the embodiments shown in the figures, four fasteners 114 are included as there are four points of connections of the downward extending posts 104 and the upward extending posts 112. Loosening the fastener 114 at each of the connections of the posts 104, 112, allows the pair of legs 110 to pivot at the connections of the posts 104, 112 and tightening the fastener 114 holds the position of the pair of legs 110 at the connections of posts 104, 112. The fastener 114 allows the pair of legs 110 to be locked in placed or moved into the desired location. The fastener 114 may include, and not be limited to, a bolt. Additionally, the grooves on the outer surface 104a and the ridges on the inner surface 112a of each downward extending post 104 and upward extending post 112, respectively, engage with each other when the fastener 114 is tightened or disengaged with each other when the fastener 114 is loosened. In the engaged position, the pair of legs 110 of legs are in the locked position and do not pivot as there is enough friction between the grooves and the ridges to prevent slipping. In the disengaged position, the friction element is removed by loosening the grooves from the ridges and therefore the pair of legs 110 can pivot inward or outward.

Figure 4:
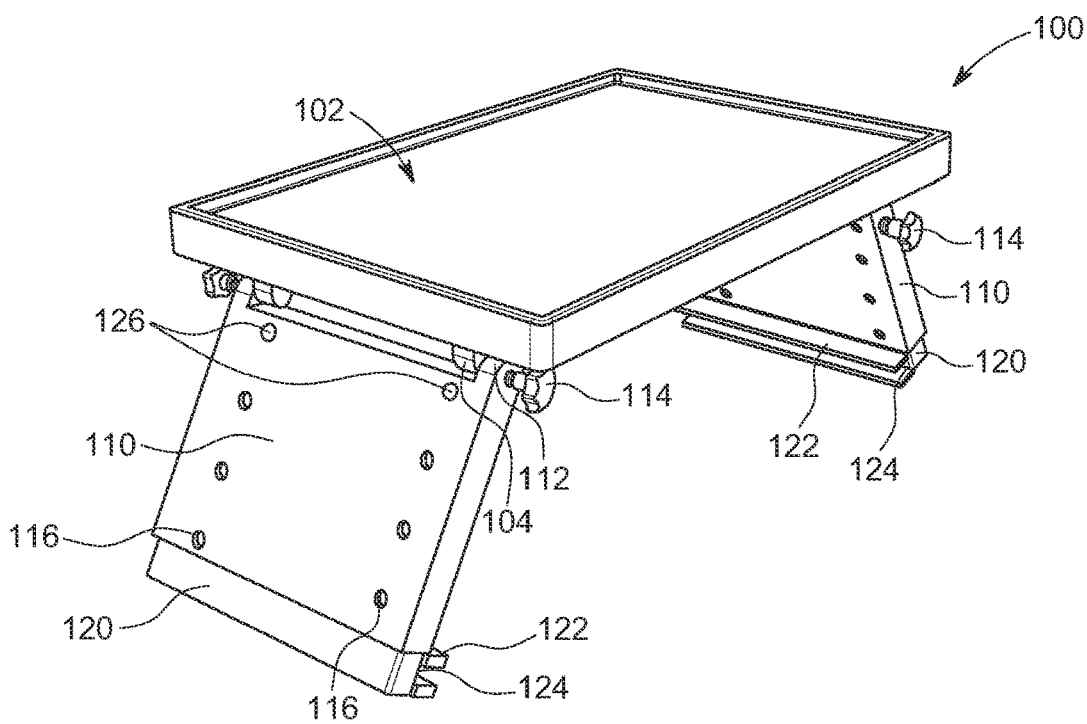
FIG. 4 is a pictorial illustration of an adjustable workstation with legs angled outward in accordance with an illustrative embodiment.
Figure 5:
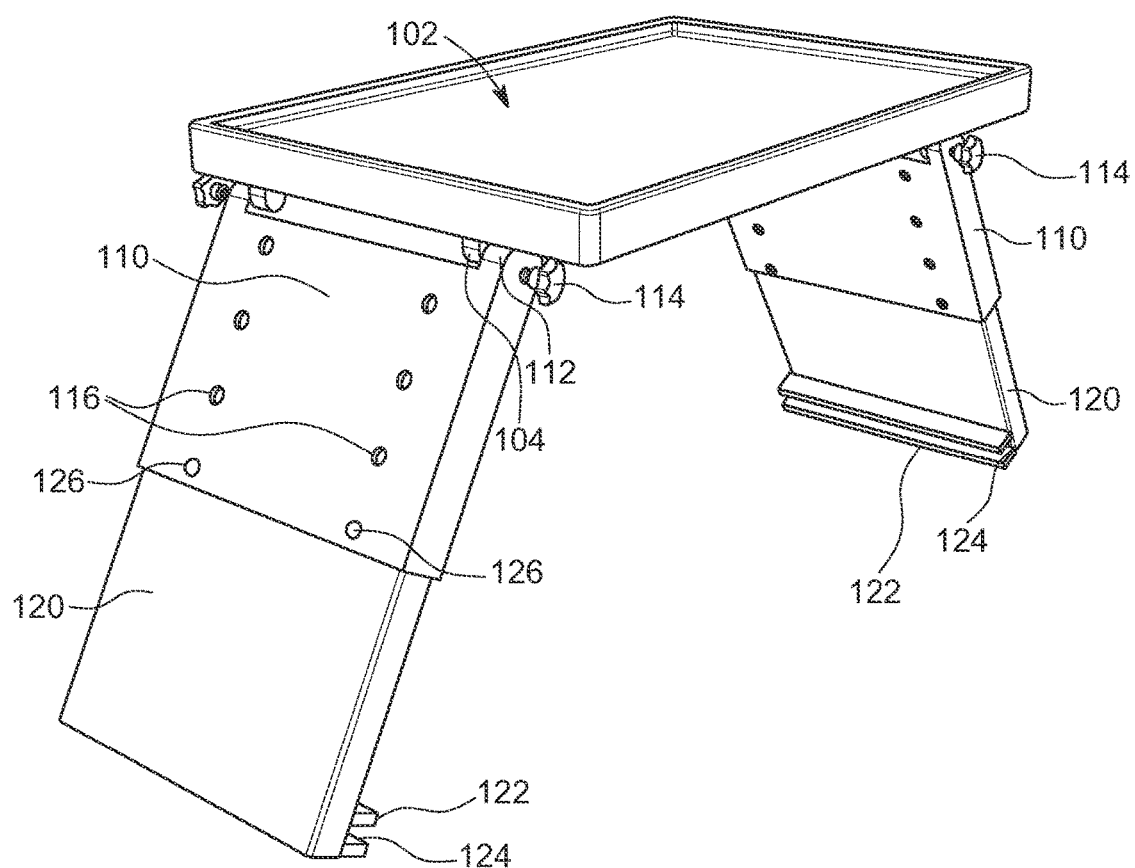
FIG. 5 is a pictorial illustration of an adjustable workstation with legs extended and angled outward in accordance with an illustrative embodiment.
Figure 6:
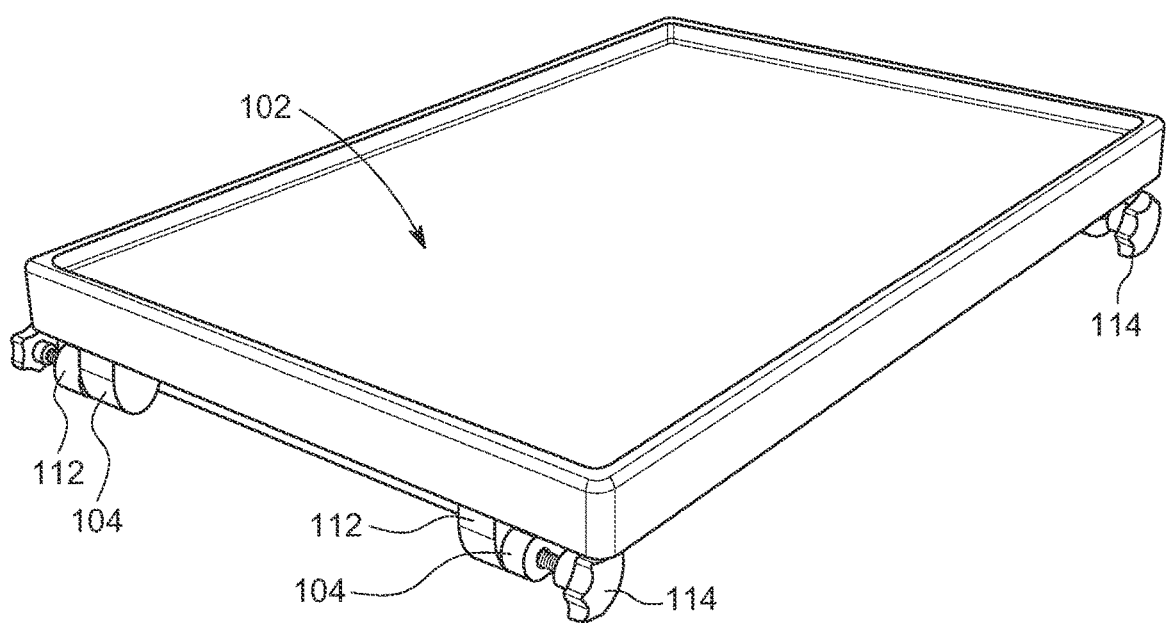
FIG. 6 is a pictorial illustration of an adjustable workstation in a folded position with legs folded inward in accordance with an illustrative embodiment.
Figure 7:
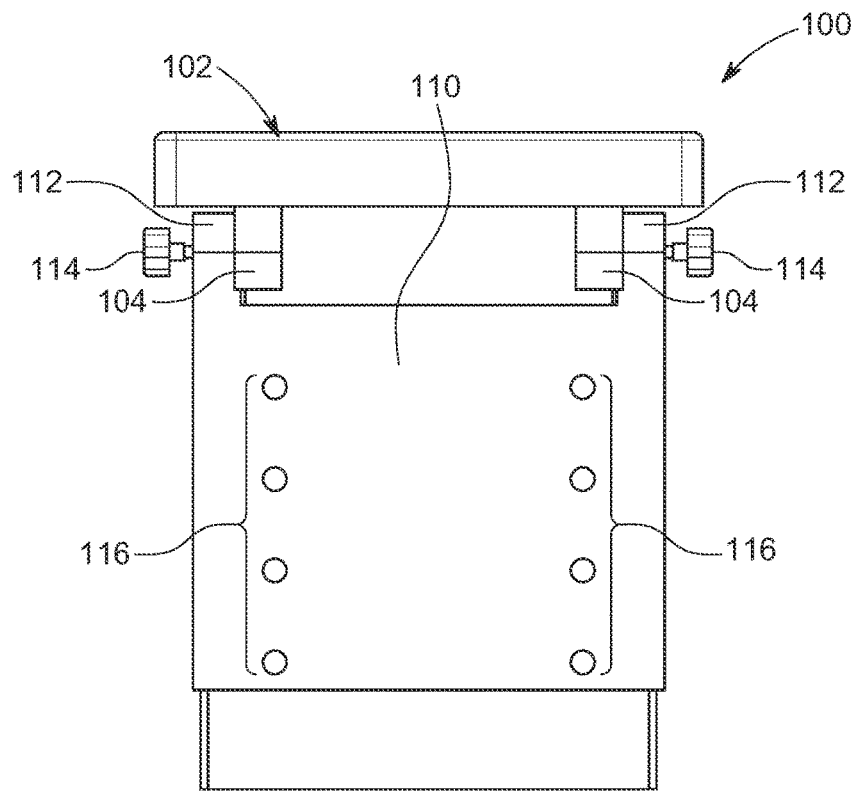
FIG. 7 is a pictorial illustration of a side view of an adjustable workstation in accordance with an illustrative embodiment.

FIGS. 4 and 5 illustrate the one or more legs 110 in the extended position. The advantage of the adjustable workstation 100 is that the pair of legs 110 may allow the adjustable workstation 100 to be attachable to varying widths of seat back tray tables by angling the pair of legs 110 outward at the connection with platform 102 or angling the pair of legs 110 inward at the connection with the platform 102 to an appropriate width to fit on a seat back tray table. Additionally, FIG. 6 also illustrates the adjustable workstation 100 in a fully folded position which may be used as such on a seat back tray table or may be stored away easily.

As best seen in FIGS. 1 to 5, the pair of legs 110 are adjustable wherein a height of the platform 102 may be adjusted vertically. The pair of legs 110 are configured to telescope, which allows the height of the platform 102 to be adjusted vertically. Each of the pair of legs 110 is hollow and is configured to slidingly accept a telescoping leg piece 120 within the hollow area. Each of the pair of legs 110 also has one or more rows of holes 116 wherein the holes 116 in each row are vertically in line. Each of the telescoping leg pieces 120 includes one or more holes 123 at a proximal end of the telescoping leg pieces, wherein each row of holes 116 in the pair of legs 110 aligns with one hole 123 in the telescoping leg piece 120 inserted into the particular leg 110. In other words, a number of holes of the one or more holes 123 in each leg of the pair of telescoping legs 120 is equal in number to a number of holes 116 in each row of the one or more rows of holes 116 on a single leg of the pair of legs 110, and wherein the one or more holes 123 are proximal to a top end of each of the pair of telescoping legs 120 and positioned to align with one row of the one or more rows of holes 116 on the pair of legs 110. Further, a button clip 126 is disposed within each of the pair of telescoping legs 120 which are hollow, wherein a number of button clips 126 corresponds to the number of one or more holes 123. The button clip 126 engages with the one or more holes 123 in the pair of telescoping legs 120 and the one or more holes 116 in the one row of holes 116 in the pair of telescoping legs, such that the telescoping leg piece 120 can slide within the pair of legs 110 to adjust a length of the one or more legs 110 and lock into a position in the holes in the one or more rows of holes 116. It is to be understood that other means to adjust the height of the platform may be used. For example, the pair of legs 110 may use a lever mechanism to slide the telescoping leg piece 120 within the pair of legs 110 wherein a lever may be loosened and tightened to slide and lock the telescoping leg piece 120, respectively.

The adjustable workstation 100 may be used in conjunction with a seat back tray table. The adjustable workstation 100 is configured to attach to a seat back tray table on a vehicle that may have such a table. Most seat back tray tables have a certain thickness and the adjustable workstation 100 is designed to accommodate that thickness with some variance. Referring to the figures, the telescoping leg piece 120 that slides into and connect to the pair of legs 110 includes an attachment piece 122 integrated to an inner surface of the telescoping leg piece 120. As seen in the figures, the attachment piece 122 is shown to include two parallel projecting pieces that extend an entire width of the telescoping leg piece 120, and further includes channel 124 in a middle of the two projection pieces. The two parallel projecting pieces are spaced apart at a certain distance, which may be equal to a thickness of a standard seat back tray table, and project outward a certain distance such that these pieces may be clipped around a left and a right side of the seat back tray table to connect the adjustable workstation to the seat back tray table. It is to be understood that other attachment means are also within the disclosure of the invention which may include and not be limited to clamps or hooks that slide over the width edge of the tray table.

Figure 8:
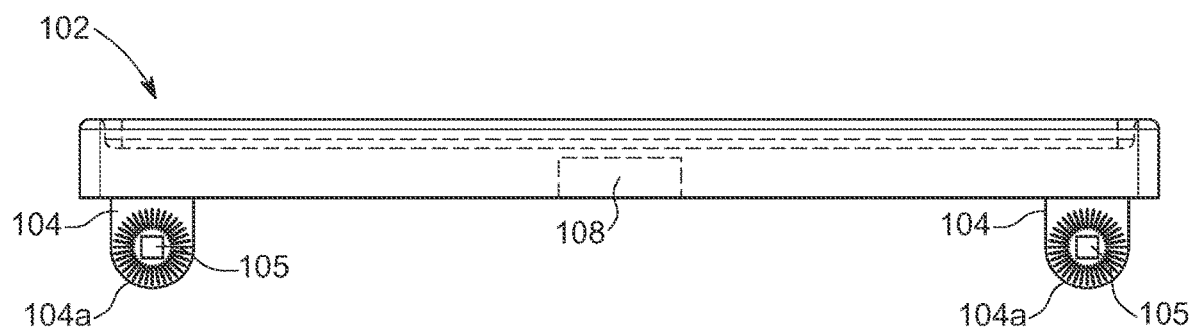
FIG. 8 is a pictorial illustration of a side view of a platform only in accordance with an illustrative embodiment.

Referring to FIG. 8, the bottom surface of the platform 102 includes a recessed section 108 which is configured along a center line of the platform 102 from the upper edge 102a to the lower edge 102b. The recessed section 108 has a length and a width that is configured to accommodate the attachment pieces 122 on each of the telescoping leg pieces 120 when the pair of legs 110 with the telescoping leg pieces 120 are fully folded inward to allow the pair of legs 110 to fold inward completely.

The corresponding structures, materials, acts, and equivalents of any means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention.

The embodiments were chosen and described in order to best explain the principles of the invention and the practical application, and to enable others of ordinary skill in the art to understand the invention for various embodiments with various modifications as are suited to the particular use contemplated. The present invention, according to one or more embodiments described in the present description, may be practiced with modification and alteration within the spirit and scope of the appended claims. Thus, the description is to be regarded as illustrative instead of restrictive of the present invention.

What is claimed is:

1. A portable workstation, comprising:
    a platform having a length, a width, a top surface, and a bottom surface;
    a pair of legs connected to the bottom surface of the platform, wherein the pair of legs can pivot at the platform; and
    a pair of telescoping leg pieces, wherein each leg piece of the pair of telescoping leg pieces is connected to one leg of the pair of legs and connectable to a seat back tray, wherein each telescoping leg piece of the pair of telescoping leg pieces includes an attachment piece which includes two parallel projecting pieces extending an entire width of the telescoping leg piece, wherein the two parallel projecting pieces include a channel having a width, wherein the width is similar to a thickness of the seat back tray table.

2. The portable workstation of claim 1, wherein the top surface is a work surface and includes a raised lip along an upper edge, a lower edge, a left edge, and a right edge, and the work surface is recessed between the raised lip.

3. The portable workstation of claim 2, wherein a padding is dimensioned to fit on the top surface between the raised lip, wherein the padding has a shape and a size commensurate to the top surface such that the padding edges abut against the raised lip.

4. The portable workstation of claim 1, wherein the pair of legs are positioned such that a first leg of the pair of legs is along a left edge of the platform, and a second leg of the pair of legs is along a right edge of the platform.

5. The portable workstation of claim 4, wherein each of the first leg and the second leg extends along the bottom surface of the platform from the upper edge of the platform to the lower edge of platform.

6. The portable workstation of claim 1, wherein the pair of legs are hollow, and the pair of telescoping leg pieces are dimensioned to slidingly fit within the pair of legs, wherein each leg of the pair of legs accepts one telescoping leg piece of the pair of telescoping leg pieces, and
    wherein the pair of telescoping leg pieces slide within the pair of legs to vertically adjust a height of the platform.

7. The portable workstation of claim 6, further comprising:
    one or more rows of holes on each leg of the pair of legs, wherein the holes in each row of the one or more rows are vertically in-line;
    one or more holes on each telescoping leg piece of the pair of telescoping leg pieces, wherein the holes on each telescoping leg piece are in equal number to a number holes in a row of the one or more rows of holes on a single leg of the pair of legs, and wherein the one or more holes are proximal to a top end of each telescoping leg piece of the pair of telescoping leg pieces and positioned to align with the one or more rows of holes; and
    one or more button clips disposed within each pair of telescoping leg pieces, wherein a number of button clips in each telescoping leg piece of the pair of telescoping leg pieces is equal in number to a number of holes on each telescoping leg piece of the pair of telescoping leg pieces, and wherein each hole on the pair of telescoping leg pieces is engaged with one button clip;
    wherein the one or more button clips within the pair of telescoping leg pieces lock each telescoping leg piece of the pair of telescoping leg pieces into position by engaging with the holes in the one or more rows of holes on the pair of legs.

8. The portable workstation of claim 1, wherein
    a left edge of the bottom surface of the platform includes a first pair of downward extending posts that extend perpendicularly downward from the bottom surface, with a post from the first pair of downward extending posts positioned along each corner on the left edge of the platform;
    a right edge of the bottom surface of the platform includes a second pair of downward extending posts that extend perpendicularly downward from the bottom surface, with a post from the second pair of downward extending posts positioned along each corner on the right edge of the platform; and
    each leg of the pair of legs has two upward extending posts at a top end wherein the two upward extending posts on a first leg from the pair of legs is connected to the first pair of downward extending posts on the left edge of the bottom surface of the platform, and wherein the two upward extending posts on a second leg from the pair of legs is connected to the second pair of downward extending posts on the right edge of the bottom surface of the platform.

9. The portable workstation of claim 8, wherein each leg of the pair of legs pivots at a connection of the two upward extending posts and the downward extending posts, wherein each leg can pivot inward toward the bottom surface of the platform, and outward away from the platform.

10. The portable workstation of claim 8, wherein an outer facing surface of the downward extending pair of posts has a textured surface which engages with a textured surface on an inner facing surface of the upward extending legs.

11. The portable workstation of claim 1, wherein a bottom surface of the platform includes a recessed section which is configured along a center line of the platform from an upper edge to a lower edge of the platform, wherein the recessed section has a length and width to accommodate the attachment pieces when the pair of legs connected to the telescoping leg piece are folded inward toward the platform.

12. A portable workstation, comprising:
a platform having a top surface and a bottom surface, wherein the top surface includes a raised lip along an edge of the platform defining a perimeter of the platform;
a pair of legs hingedly connected to the bottom surface of the platform, wherein each leg of the pair of legs can pivot inward toward the platform and outward away from the platform, and wherein a fastener can be tightened to lock in a position of the legs and the fastener can be loosened to allow the pair of legs to pivot; and
a pair of telescoping leg pieces, wherein each telescoping leg piece of the pair of telescoping leg pieces is connected to each leg of the pair of legs and connectable to a seat back tray, wherein each telescoping leg piece of the pair of telescoping leg pieces includes an attachment piece which includes two parallel projecting pieces extending an entire width of the telescoping leg piece, wherein the two parallel projecting pieces include a channel having a width, wherein the width is similar to a thickness of the seat back tray table.

13. The portable workstation of claim 12, wherein a padding is dimensioned to fit on the top surface within the raised lip, wherein the padding has a shape and a size commensurate to the top surface such that edges of the padding abut against the raised lip.

14. The portable workstation of claim 12, wherein the pair of legs are positioned such that a first leg of the pair of legs is along a left edge, and a second leg of the pair of legs is along a right edge.

15. The portable workstation of claim 14, wherein each of the first leg and the second leg extends along the bottom surface of the platform from the upper edge of the platform to the lower edge of the platform.

16. The portable workstation of claim 12, wherein the pair of legs are hollow, and the pair of telescoping leg pieces are dimensioned to slidingly fit within the pair of legs, wherein each leg of the pair of legs accepts one telescoping leg piece of the pair of telescoping leg pieces, and
wherein the pair of telescoping leg pieces slide within the pair of legs to vertically adjust a height of the platform.

17. The portable workstation of claim 16, further comprising:
one or more rows of holes on each leg of the pair of legs, wherein the holes in each row are vertically in-line;
one or more holes on each telescoping leg piece of the pair of telescoping leg pieces, wherein the one or more holes on each telescoping leg piece are in equal number to a number of holes in each row of the one or more rows of holes on a single leg of the pair of legs, and wherein the one or more holes are proximal to a top end of each telescoping leg piece of the pair of telescoping leg pieces and positioned to align with the one or more rows of holes; and
one or more button clips disposed within each pair of telescoping leg pieces, wherein a number of button clips in each telescoping leg piece of the pair of telescoping leg pieces is equal in number to a number of holes on each telescoping leg piece of the pair of telescoping leg pieces, and wherein each hole on the pair of telescoping leg pieces is engaged with one button clip;
wherein the button clips within the pair of telescoping leg pieces lock each telescoping leg piece of the pair of telescoping leg pieces into position by engaging with the holes in the one or more rows of holes on the pair of legs.

18. The portable workstation of claim 12, wherein
a left edge of the bottom surface of the platform includes a first pair of downward extending posts that extend perpendicularly downward from the bottom surface, with a post from the first pair of downward extending posts positioned along each corner on the left edge of the platform;
a right edge of the bottom surface of the platform includes a second pair of downward extending posts that extend perpendicularly downward from the bottom surface, with a post from the second pair of downward extending posts positioned along each corner on the right edge of the platform; and
each leg of the pair of legs has two upward extending posts at a top end wherein the two upward extending posts on a first leg from the pair of legs is connected to the first pair of downward extending posts on the left edge of the bottom surface of the platform, and wherein the two upward extending posts on a second leg from the pair of legs is connected to the second pair of downward extending posts on the right edge of the bottom surface of the platform.

19. The portable workstation of claim 18, wherein each leg of the pair of legs pivots at a connection of the two upward extending posts and the downward extending posts, wherein each leg can pivot inward toward the bottom surface of the platform, and outward away from the platform.

20. The portable workstation of claim 18, wherein an outer facing surface of the downward extending pair of posts has a textured surface which engages with a textured surface on an inner facing surface of the upward extending posts.

21. The portable workstation of claim 12, wherein the bottom surface of the platform includes a recessed section which is configured along a center line of the platform from an upper edge to the lower edge of the platform, wherein the recessed section has a length and width to accommodate the attachment pieces when the pair of legs connected to the telescoping leg pieces are folded inward toward the platform.

* * * * *